US007266785B2

(12) United States Patent
Grotjohn

(10) Patent No.: US 7,266,785 B2
(45) Date of Patent: Sep. 4, 2007

(54) SHOWING ANCESTORS IN TREE VIEW WHILE SCROLLING

(75) Inventor: D. Kirk Grotjohn, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 10/736,124

(22) Filed: Dec. 15, 2003

(65) Prior Publication Data

US 2005/0132303 A1 Jun. 16, 2005

(51) Int. Cl.
*G06F 15/00* (2006.01)
*G06F 13/00* (2006.01)
(52) U.S. Cl. ............. 715/853; 715/841; 715/786
(58) Field of Classification Search ........ 715/843, 715/705, 708, 711, 715, 738, 781–787, 808, 715/809, 853, 841, 830, 764
See application file for complete search history.

(56) References Cited

U.S. PATENT DOCUMENTS 5,333,254 A * 7/1994 Robertson ............ 715/853
6,380,957 B1 4/2002 Banning
6,430,574 B1 * 8/2002 Stead ............... 707/104.1
6,448,985 B1 9/2002 McNally
6,462,762 B1 * 10/2002 Ku et al. ............. 715/853
6,477,528 B1 11/2002 Takayama
6,496,208 B1 12/2002 Bernhardt et al.
2001/0043238 A1 11/2001 Guerrero
2002/0154176 A1 10/2002 Barksdale et al.

* cited by examiner

*Primary Examiner*—Cao (Kevin) Nguyen
(74) *Attorney, Agent, or Firm*—Duke W. Yee; Martin J. McKinley; Theodore D. Fay, III

(57) ABSTRACT

A method, apparatus, and computer instructions for indicating the current ancestor hierarchy in a graphical user interface while scrolling through a tree structure. A determination is made as to the current ancestor hierarchy of an item displayed in a designated section of the tree structure. The designated section of the tree structure may be the topmost, bottommost, or any other file or directory displayed in the pane. When user searches for files or folders by scrolling through data displayed in a tree structure, a new item may be displayed in the designated section of the tree structure. As a result, the ancestor hierarchy display is updated with the current ancestor hierarchy for the item in the designated section of the tree structure.

32 Claims, 6 Drawing Sheets

SHOWING ANCESTORS IN TREE VIEW WHILE SCROLLING

BACKGROUND OF THE INVENTION

1. Technical Field

The present invention relates generally to an improved graphical user interface for a computer system. In particular, the present invention relates to a method, apparatus, and computer instructions for indicating, in a graphical user interface, the directory location of the currently visible elements while scrolling through a tree structure.

2. Description of Related Art

Directory tree controls are ubiquitous in computer programs today. Information stored in large data resources is structured to allow a user to easily view and access the information. The typical data structure used in these large data resources is a directory tree structure.

In a tree structure, data files are organized in a hierarchical format and displayed for viewing. Microsoft DOS, Windows, and the Macintosh OS are examples of operating systems whose file systems group files into directories. Directories are often referred to as folders. Directories may contain files or other directories. Within the tree structure, a user can select and manipulate files represented by members within the tree utilizing a mouse, keyboard or other input device. User selection via a mouse can be accomplished by "pointing and clicking" on a selectable feature on the computer display.

While the tree structure is useful and is quite prevalent within the operating systems and applications of most present day computers, as the number of files and directories within a computer that a user must manage is growing at a significant rate, it can become unwieldy for a user to understand the tree structure using currently known methods. The large memory capacity now available in modern personal computers has been utilized by application writers to create software with an increasing number of components. Further, the linking of external memory through interconnected computers has further increased the proliferation of the number of files, software tools and other system objects which are accessible to and often displayed in a tree format to a user.

FIG. 1 is a pictorial representation of a graphical user interface for a computer system showing a known tree structure. Window 100 in FIG. 1 illustrates a data resource that contains many branches and many levels to each branch. Four vertical dotted lines 102, 104, 106, 108, in left pane 110 of window 100 indicate that there are four ancestors for the folders currently in view. When a user is scrolling through the tree structure, window 100 does not provide any details as to where the user is in the directory structure. This situation is not a problem if a user selects a particular item or folder in the display, for once the item is selected, the selected item and its ancestors are shown in Address bar 112 (if present). However, if the user is scrolling through the large directory structure in search of a particular folder, a user may not know where in the data hierarchy the folders currently in view are located. Searching for a particular folder by selecting each folder in the display (e.g., pressing the down arrow button on the keyboard to select each folder, etc.) is cumbersome since the user may scroll only one item at a time. In addition, there may be a delay when selecting each item as the contents of each selection is displayed in right pane 114. Thus, as data tree controls are used to represent increasing larger sets of resources, a user may find that he or she cannot view the parent or grandparent node of the nodes currently in view.

Therefore, it would be advantageous to have an improved method, apparatus, and computer instructions for indicating the current ancestor hierarchy in a graphical user interface while scrolling through the tree structure.

SUMMARY OF THE INVENTION

The present invention provides a method, apparatus, and computer instructions for indicating the current ancestor hierarchy in a graphical user interface while scrolling through the tree structure. A determination is made as to the current ancestor hierarchy based on an item displayed in a designated section of the tree structure. The designated section of the tree structure may be the topmost, bottommost, or any other file or directory displayed in the pane. When a user searches for files or folders by scrolling through data displayed in a tree structure, a new item may be shown in the designated section of the tree structure. As a result, the ancestor hierarchy display is updated with the current ancestor hierarchy for the item in the designated section of the tree structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
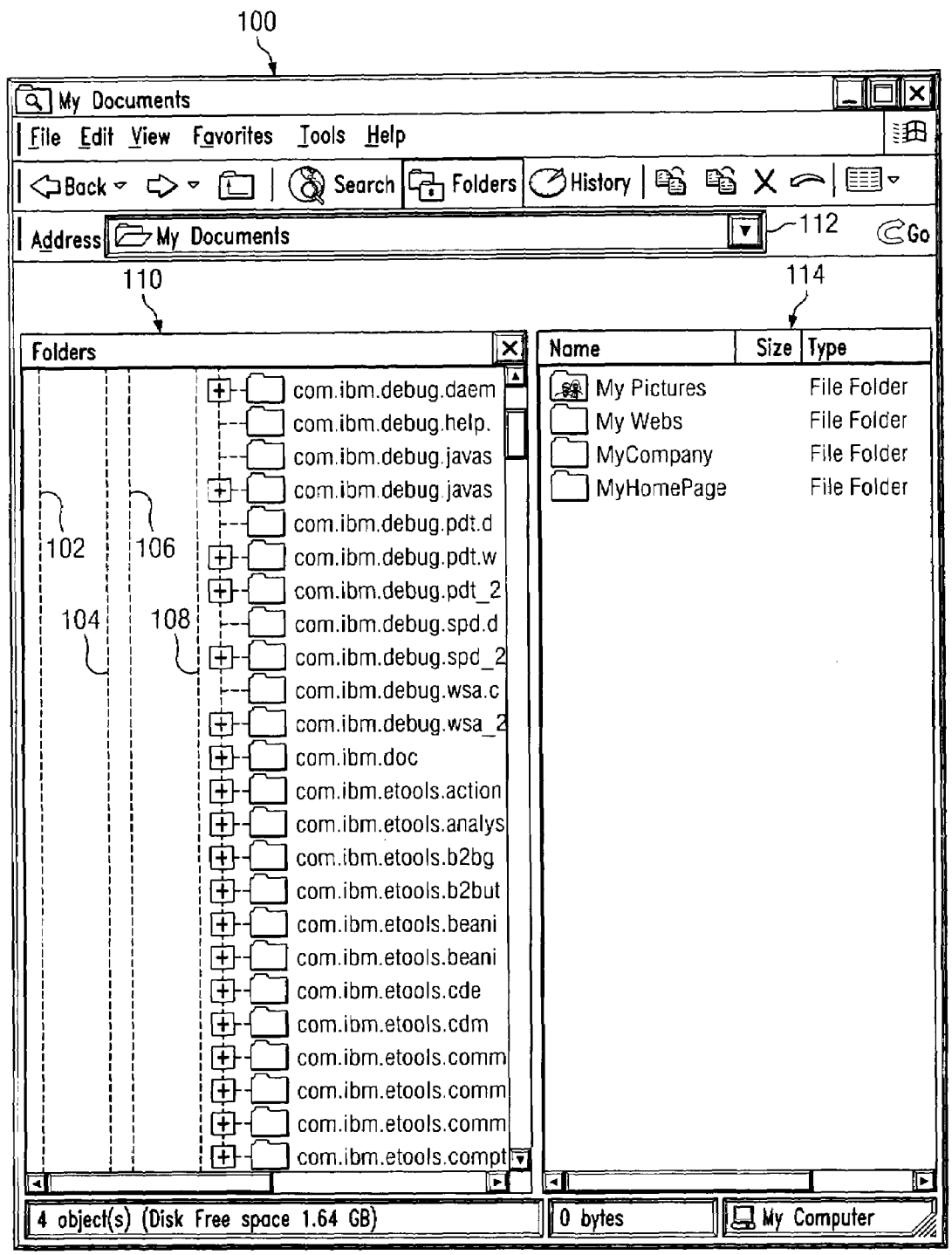
FIG. 1 is a pictorial representation of a graphical user interface for a computer system showing a known tree interface.
Figure 2:
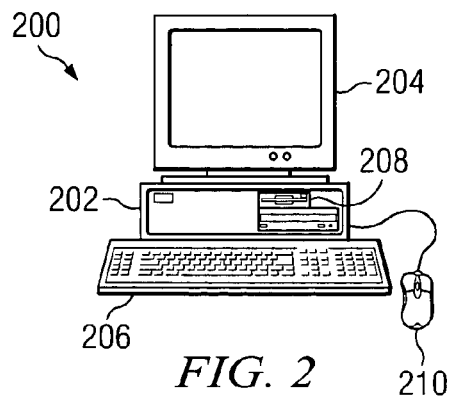
FIG. 2 is a pictorial representation of a data processing system in which the present invention may be implemented in accordance with a preferred embodiment of the present invention.

With reference now to the figures and in particular with reference to FIG. 2, a pictorial representation of a data processing system in which the present invention may be implemented is depicted in accordance with a preferred embodiment of the present invention. A computer 200 is depicted which includes system unit 202, video display terminal 204, keyboard 206, storage devices 208, which may include floppy drives and other types of permanent and removable storage media, and mouse 210. Additional input devices may be included with personal computer 200, such as, for example, a joystick, touchpad, touch screen, trackball, microphone, and the like. Computer 200 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 200 also preferably includes a graphical user interface (GUI) that may be implemented by means of systems software residing in computer readable media in operation within computer 200.

Figure 3:
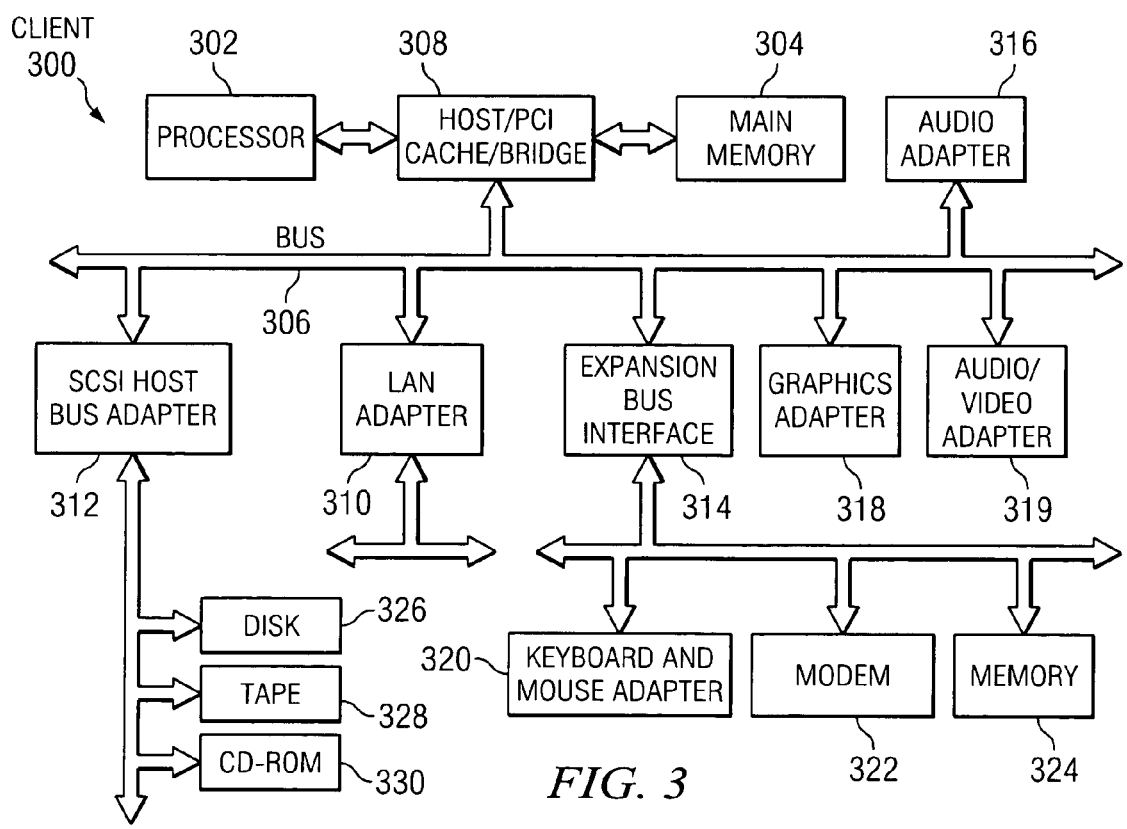
FIG. 3 is a block diagram illustrating a data processing system in which the present invention may be implemented.

With reference now to FIG. 3, a block diagram of a data processing system is shown in which the present invention may be implemented. Data processing system 300 is an example of a computer, such as computer 200 in FIG. 2, in which code or instructions implementing the processes of the present invention may be located. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as Windows XP, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330. In that case, the computer, to be properly called a client computer, includes some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a personal digital assistant (PDA), which is configured with ROM and/or flash ROM to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The processes of the present invention are performed by processor 302 using computer implemented instructions, which may be located in a memory such as, for example, main memory 304, memory 324, or in one or more peripheral devices 326-330.

The present invention provides a method, apparatus, and computer instructions for showing the current ancestor hierarchy in a tree structure while scrolling through the tree structure. In current tree structures representing large sets of resources, it may be difficult for a user to navigate and maneuver through the tree structure. The present invention overcomes problems associated with navigating through the director tree by indicating the current ancestor hierarchy as the user scrolls through the tree structure.

When a user scrolls through a large data structure searching for a particular folder, a user may lose track of where in the tree structure the items currently in view are located. The present invention proposes showing the current ancestor hierarchy based on an item displayed in a designated section of the tree structure. The designated section of the tree structure may be the topmost, bottommost, or any other file or directory displayed in the pane. As the user scrolls through the tree structure, if a new item is shown in the designated section of the tree structure, the current ancestor hierarchy display is updated. The current ancestor hierarchy for the new item is then displayed in the tree structure.

Figure 4A:
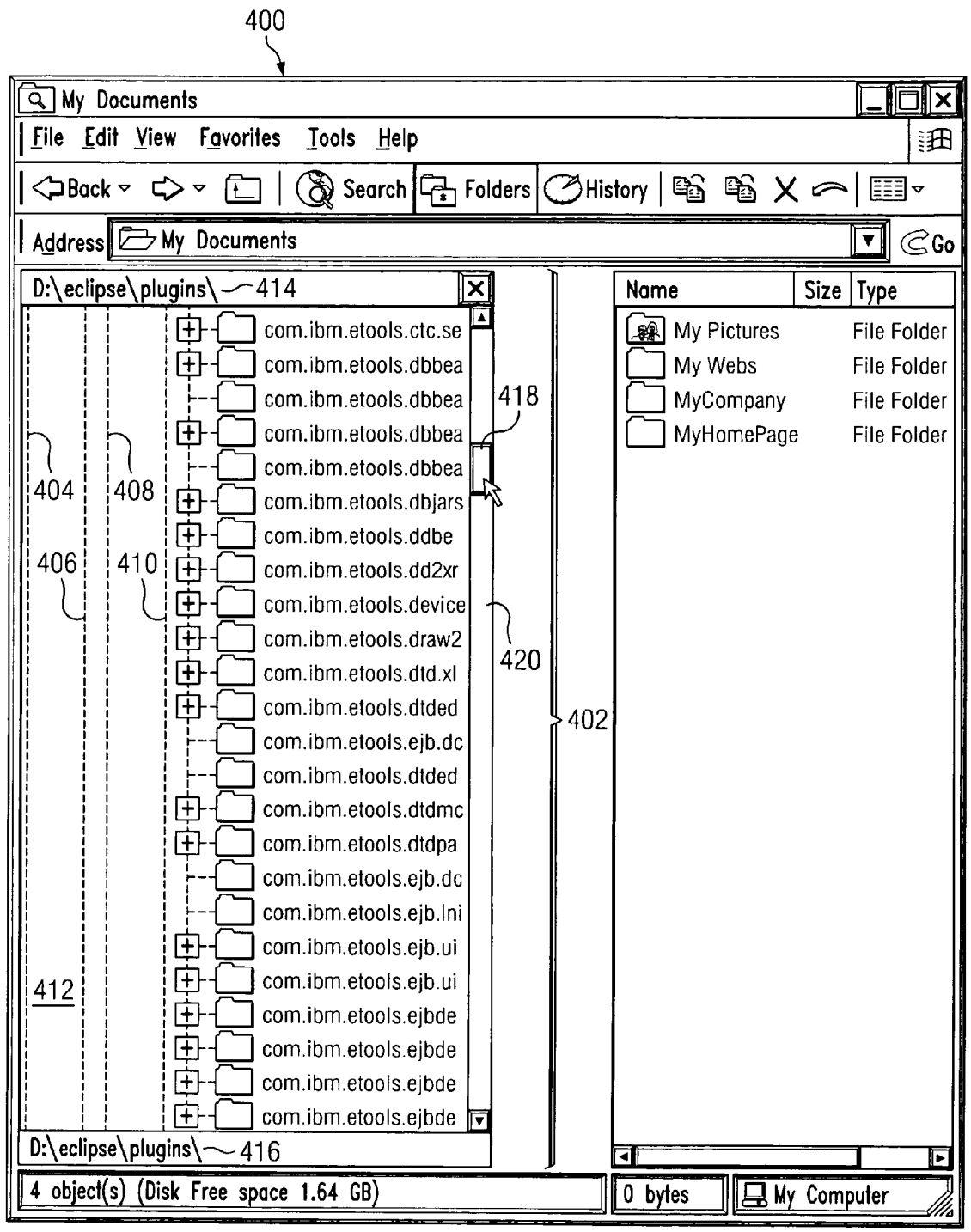
FIG. 4A is an example of providing a text display of the full path of the current ancestor hierarchy by adding dedicated areas of the graphical user interface.
Figure 4B:
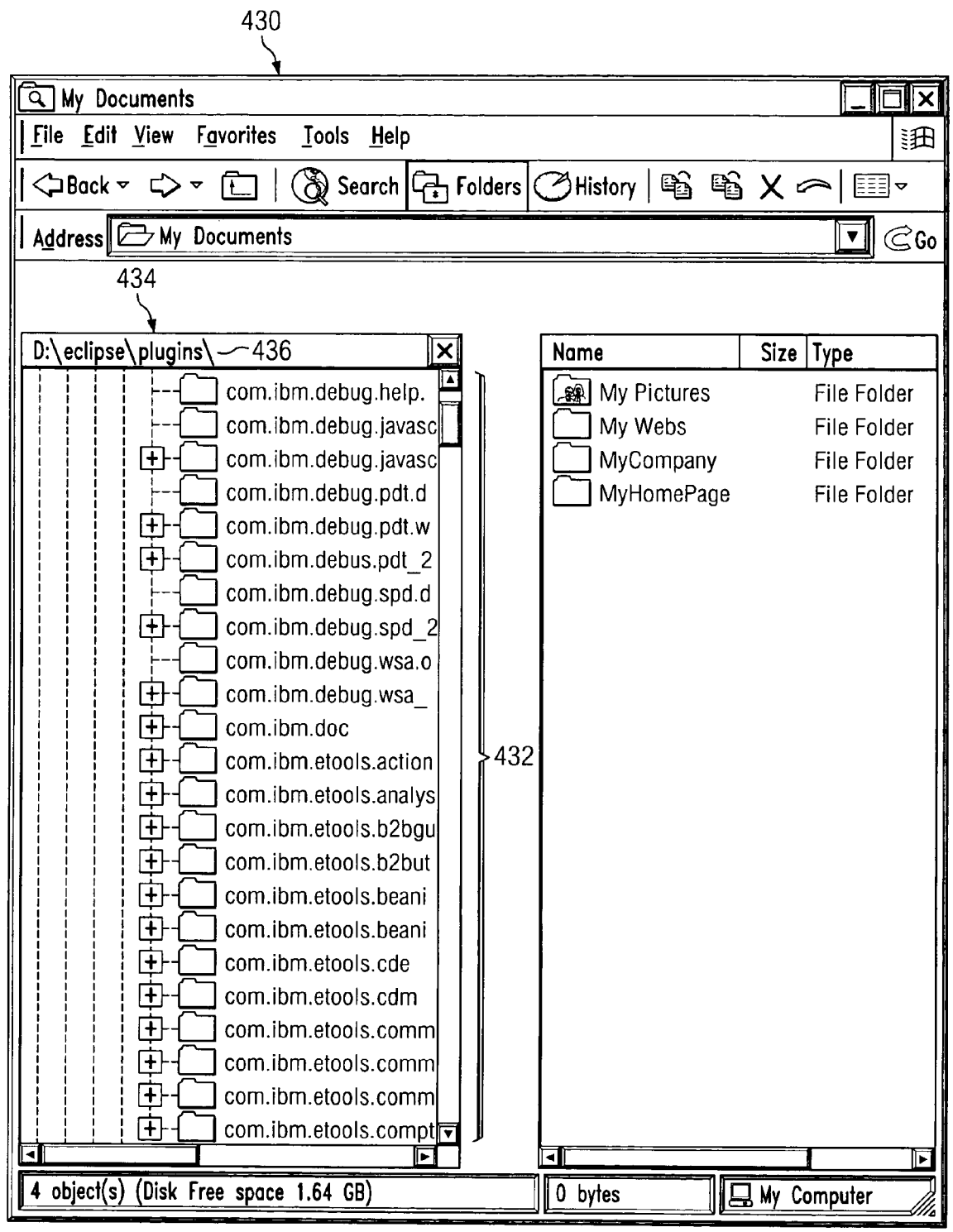
FIG. 4B is an example of an alternative embodiment for providing a text display of the full path of the current ancestor hierarchy by replacing existing areas of the graphical user interface.
Figure 4C:
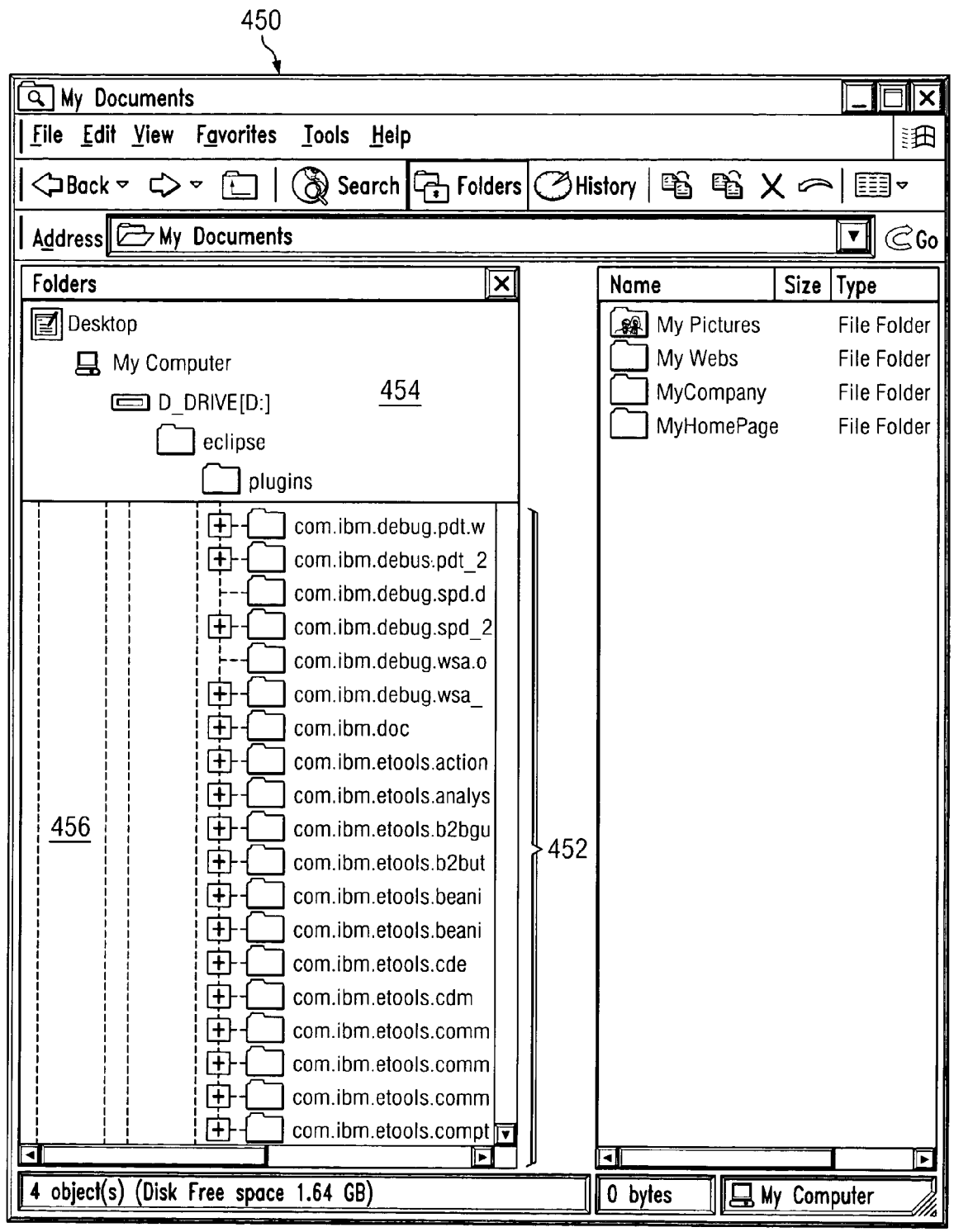
FIG. 4C is an example of another alternative embodiment for providing a graphical display of the full path of the current ancestor hierarchy in a manner consistent with a tree structure display.

FIGS. 4A-4C illustrate examples of different options for indicating the current ancestor hierarchy while scrolling through a tree structure. Although FIGS. 4A-4C are shown in a Microsoft Windows environment, the present invention may be used in any software program to organize data using any tree metaphor.

FIG. 4A depicts an example of providing a text display of the full path of the current ancestor hierarchy by adding dedicated areas of the graphical user interface. Window 400 in FIG. 4A illustrates a data resource that contains many branches and many levels to each branch in tree structure 402. Tree structure 402 may be executed on a data processing system, such as data processing system 300 in FIG. 3. Four vertical dotted lines 404, 406, 408, 410 in left pane 412 of window 400 indicate that there are four ancestors for the folders currently in view, although the user does not know what they are. It should be noted that Address Bar 422 is not showing the current location because the selected item, which is no longer in view, has not changed. Text display 414 of the ancestor hierarchy is shown at the top of window 400 in FIG. 4A. However, text display 414 may be shown in any location in window 400.

The full path of the current ancestor hierarchy is displayed in an existing area of window 400 by adding a dedicated area of the graphical user interface to display the current ancestor hierarchy, such as dedicated area 416. In this embodiment, text display 414 is displayed only while the user is scrolling tree structure 402, and is hidden from view a specified amount of time after scrolling has ended. A user may scroll through tree structure 402 by clicking and dragging slider 418 in scroll bar 420. If the user scrolls by selecting the up/down buttons or the page up/page down buttons on the keyboard, or by clicking the up/down arrows on scroll bar 420, the full path of the current ancestor hierarchy may temporarily be displayed for a specified period of time.

FIG. 4B depicts an alternative embodiment for providing a text display of the full path of the current ancestor hierarchy by replacing existing areas of the graphical user interface. Window 430 contains tree structure 432, which may be executed on a data processing system, such as data processing system 300 in FIG. 3. Text displays 434, 436 of the ancestor hierarchy are shown at the top and bottom of window 430 in FIG. 4B. However, text displays 434, 436 may be shown in any location in window 430.

As the full path of the current ancestor hierarchy is displayed in an existing area of window 430, text display 434, 436 replaces a section of left pane 432. In this alternative embodiment, text displays 434, 436 are displayed only while the user is scrolling tree structure 432, and are hidden from view a specified amount of time after scrolling has ended.

FIG. 4C depicts another alternative embodiment for providing a graphical display of the full path of the current ancestor hierarchy by in a manner consistent with a tree structure display. Window 450 contains tree structure 452, which may be executed on a data processing system, such as data processing system 300 in FIG. 3.

Graphical display 454 of the ancestor hierarchy is shown at the top of window 450 in FIG. 4C. However, graphical display 454 may be shown in any location in window 450. The full path of the current ancestor hierarchy is displayed in a manner consistent with the graphical display of window 450. Although graphical display 454 requires more space than the embodiments illustrated in FIGS. 4A and 4B, graphical display 454 in FIG. 4C may allow a user to more quickly read and locate the immediate parent or grandparent of the item in a designated area of window 450. For example, as shown in FIG. 4C, the folders labeled "eclipse" and "plugins" is easily readable as the respective grandparent and parent for the item "com.ibm.debug.pdt.w". In addition, graphical display 454 is presented in a similar graphical format as the model used to display the directories in window 450.

In the preferred embodiment, graphical display 454 is displayed only while the user is scrolling tree structure 452, since this display requires more space in window 450. Furthermore, due to the additional space requirement, rather than displaying graphical display 454 at both the top and bottom of window 450, it would be advantageous to only display graphical display 454 at the top of window 450 when the user scrolls up tree structure 452, and only display graphical display 454 at the bottom of window 450 when the user scrolls down tree structure 452, as users are likely to look towards the top of the directory list in left pane 456 as they scroll up, and look towards the bottom as they scroll down.

When a user scrolls through a tree structure, at some point, the items shown in the window may not all be located in the same parent folder. In this situation, multiple text or graphical displays may be used in the window to indicate the ancestor hierarchies for the items shown. For example, since users are likely to look towards the top of the directory list as they scroll up, the top area of the window may display a text or graphical display of the current ancestor hierarchy for the topmost item in the window. Likewise, since users are likely to look towards the bottom of the directory list as they scroll down, the bottom area of the window may display a text or graphical display of the current ancestor hierarchy for the bottommost item in the window. In this manner, a user may obtain the current ancestor hierarchies for multiple items shown in the window.

Figure 5:
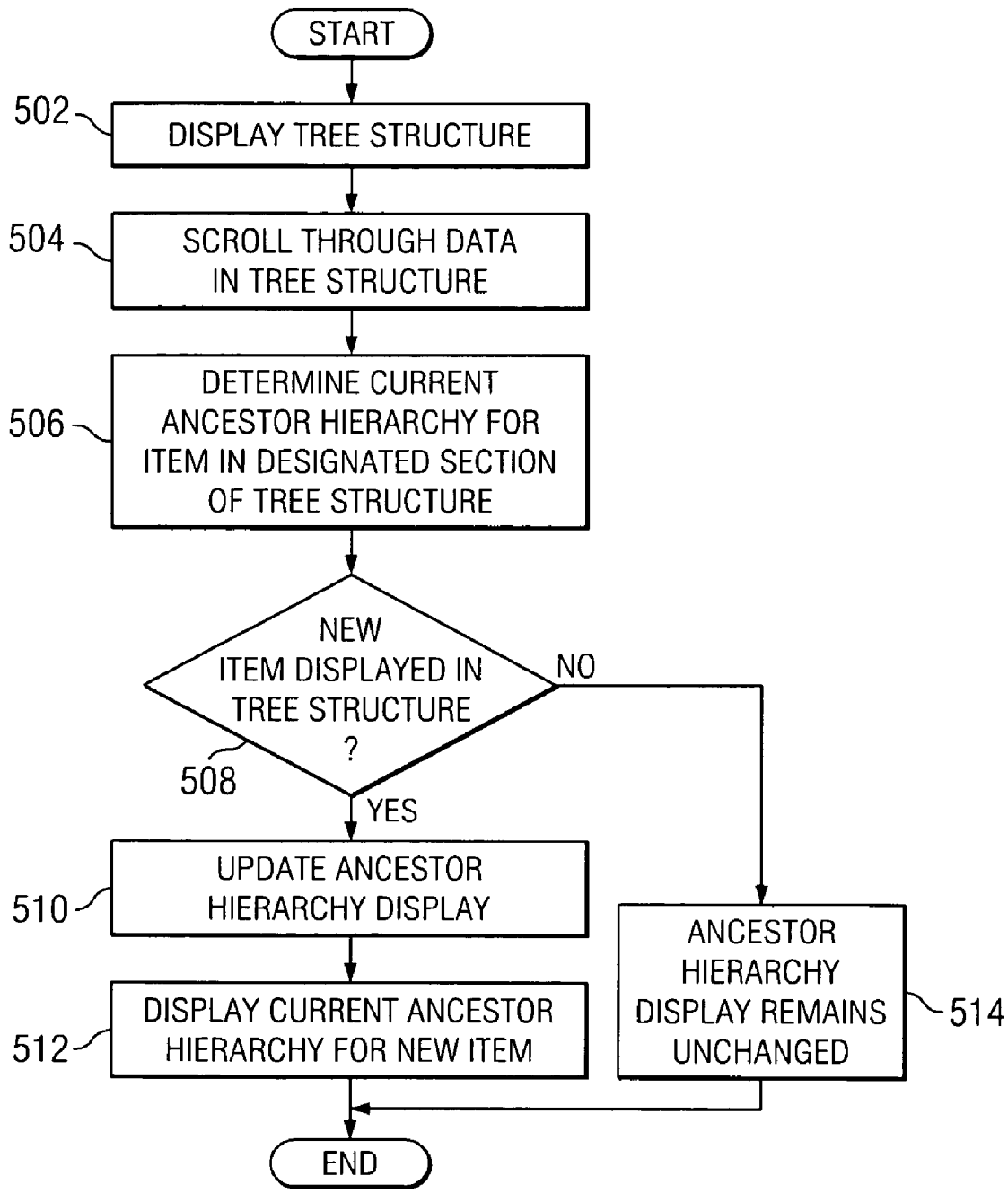
FIG. 5 is a flowchart of a process for indicating the current ancestor hierarchy while scrolling through a tree structure in accordance with a preferred embodiment of the present invention.

Turning next to FIG. 5, a flowchart of a process for indicating the current ancestor hierarchy in a tree structure while scrolling through the tree structure is depicted in accordance with a preferred embodiment of the present invention. The process illustrated in FIG. 5 may be implemented in a computer, such as computer 200 in FIG. 2.

The process begins by displaying data using a tree structure (step 502). Next, the user scrolls through the data in the tree structure (step 504). A user may scroll through the tree structure by clicking and dragging the slider in the scroll bar, selecting the up/down buttons on the keyboard, selecting the page up/page down buttons on the keyboard, and the like. A determination is then made as to the current ancestor hierarchy based on an item displayed in a designated section of the tree structure (step 506). A designated section of the tree structure may contain only one item. A designated section of the tree structure may be the topmost, bottommost, or any other file or directory displayed in the pane. As the user scrolls through the tree structure, if a new item is displayed in a designated section of the tree structure (step 508), the ancestor hierarchy display is updated with the current ancestor hierarchy for the item in a designated section of the tree structure (step 510). The current ancestor hierarchy for the new item is then displayed in the tree structure (step 512), with the process terminating thereafter. Turning back to step 508, if a new item is not displayed in a designated section of the tree structure, the current ancestor hierarchy display remains unchanged (step 514), with the process terminating thereafter.

Thus, the present invention provides an improved method, apparatus, and computer instructions for indicating the current ancestor hierarchy while scrolling through a tree structure. In these examples, a user may view the current ancestor hierarchy for an item positioned in a designated area of a graphical user interface. As the user scrolls through the tree structure in the graphical user interface, if a new item is positioned in the designated area of a graphical user interface, the ancestor hierarchy display is updated to reflect the ancestor hierarchy of the new item. In this manner, an advantage is provided over existing tree structure interfaces by allowing a user to view the current ancestor hierarchy while scrolling the tree structure.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for indicating, in a graphical user interface, a directory location of currently visible elements while scrolling through a tree structure, comprising:
    displaying data using the tree structure;
    responsive to a user input to scroll through the data in the tree structure, determining whether a current ancestor hierarchy of an item is displayed in a designated section of the tree structure; and
    displaying the current ancestor hierarchy for the item in the tree structure in response to determining whether the current ancestor hierarchy of the item is displayed in a designated section.

2. The method of claim 1, wherein the step of displaying the current ancestor hierarchy for the item in the tree structure includes displaying an updated display as a new item is displayed in the designated section of the tree structure.

3. The method of claim 1, wherein scrolling through the data in the tree structure includes one of dragging a slider in a scroll bar, selecting an up/down button on a keyboard, selecting a page up/page down button on the keyboard, and clicking an up/down arrow on the scroll bar.

4. The method of claim 1, wherein the step of displaying the current ancestor hierarchy for the item in the tree structure includes replacing an existing area of the graphical user interface.

5. The method of claim 1, wherein the step of displaying the current ancestor hierarchy for the item in the tree structure includes adding a dedicated area to the graphical user interface.

6. The method of claim 1, wherein the step of displaying the current ancestor hierarchy for the item in the tree structure includes displaying the current ancestor hierarchy in a manner consistent with the tree structure.

7. The method of claim 1, wherein the designated section of the tree structure includes one of a topmost and bottommost item displayed in the tree structure.

8. The method of claim 1, wherein the step of displaying the current ancestor hierarchy for the item in the tree structure includes displaying the current ancestor hierarchy in one location of the graphical user interface.

9. The method of claim 1, wherein the step of displaying the current ancestor hierarchy for the item in the tree structure includes displaying the current ancestor hierarchy in multiple locations of the graphical user interface.

10. The method of claim 1, wherein at least two of a plurality of items displayed in the tree structure are located in different parent directories.

11. The method of claim 10, wherein the step of displaying the current ancestor hierarchy for the item in the tree structure includes displaying a plurality of current ancestor hierarchies for the plurality of items displayed in the tree structure.

12. A data processing system for indicating, in a graphical user interface, a directory location of currently visible elements while scrolling through a tree structure, comprising:
    first displaying means for displaying data using the tree structure;
    responsive to a user input to scroll through the data in the tree structure, determining means for determining whether a current ancestor hierarchy of an item is displayed in a designated section of the tree structure; and
    second displaying means for displaying the current ancestor hierarchy for the item in the tree structure in response to determining whether the current ancestor hierarchy of the item is displayed in a designated section.

13. The data processing system of claim 12, wherein the second displaying means for displaying the current ancestor hierarchy for the item in the tree structure include updating means for displaying an updated display as a new item is displayed in the designated section of the tree structure.

14. The data processing system of claim 12, wherein scrolling through the data in the tree structure includes one of dragging a slider in a scroll bar, selecting an up/down button on a keyboard, selecting a page up/page down button on the keyboard, and clicking an up/down arrow on the scroll bar.

15. The data processing system of claim 12, wherein the second displaying means for displaying the current ancestor hierarchy for the item in the tree structure include replacing means for replacing an existing area of the graphical user interface.

16. The data processing system of claim 12, wherein the second displaying means for displaying the current ancestor hierarchy for the item in the tree structure include adding means for adding a dedicated area to the graphical user interface.

17. The data processing system of claim 12, wherein the second displaying means for displaying the current ancestor hierarchy for the item in the tree structure include presenting means for presenting the current ancestor hierarchy in a manner consistent with the tree structure.

18. The data processing system of claim 12, wherein the designated section of the tree structure includes one of a topmost and bottommost item displayed in the tree structure.

19. The data processing system of claim 12, wherein the second displaying means for displaying the current ancestor hierarchy for the item in the tree structure include presenting means for presenting the current ancestor hierarchy in one location of the graphical user interface.

20. The data processing system of claim 12, wherein the second displaying means for displaying the current ancestor hierarchy for the item in the tree structure include presenting means for presenting the current ancestor hierarchy in multiple locations of the graphical user interface.

21. The data processing system of claim 12, wherein at least two of a plurality of items displayed in the tree structure are located in different parent directories.

22. The method of claim 21, wherein the second displaying means for displaying the current ancestor hierarchy for the item in the tree structure include presenting means for presenting a plurality of current ancestor hierarchies for the plurality of items displayed in the tree structure.

23. A computer program product in a recordable-type medium for indicating, in a graphical user interface, a directory location of currently visible elements while scrolling through a tree structure, comprising:
   first instructions for displaying data using the tree structure;
   second instructions for determining whether a current ancestor hierarchy of an item is displayed in a designated section of the tree structure responsive to a user input to scroll through the data in the tree structure; and
   third instructions for displaying the current ancestor hierarchy for the item in the tree structure in response to determining whether the current ancestor hierarchy of the item is displayed in a designated section, wherein the third instructions include sub-instructions for displaying an updated display as a new item is displayed in the designated section of the tree structure.

24. The computer program product of claim 23, wherein scrolling through the data in the tree structure includes one of dragging a slider in a scroll bar, selecting an up/down button on a keyboard, selecting a page up/page down button on the keyboard, and clicking an up/down arrow on the scroll bar.

25. The computer program product of claim 23, wherein the third instructions for displaying the current ancestor hierarchy for the item in the tree structure include sub-instructions for replacing an existing area of the graphical user interface.

26. The computer program product of claim 23, wherein the third instructions for displaying the current ancestor hierarchy for the item in the tree structure include sub-instructions for adding a dedicated area to the graphical user interface.

27. The computer program product of claim 23, wherein the third instructions for displaying the current ancestor hierarchy for the item in the tree structure include sub-instructions for displaying the current ancestor hierarchy in a manner consistent with the tree structure.

28. The computer program product of claim 23, wherein the designated section of the tree structure includes one of a topmost and bottommost item displayed in the tree structure.

29. The computer program product of claim 23, wherein the third instructions for displaying the current ancestor hierarchy for the item in the tree structure include sub-instructions for displaying the current ancestor hierarchy in one location of the graphical user interface.

30. The computer program product of claim 23, wherein the third instructions for displaying the current ancestor hierarchy for the item in the tree structure include sub-instructions for displaying the current ancestor hierarchy in multiple locations of the graphical user interface.

31. The computer program product of claim 23, wherein at least two of a plurality of items displayed in the tree structure are located in different parent directories.

32. The computer program product of claim 31, wherein the third instructions for displaying the current ancestor hierarchy for the item in the tree structure include sub-instructions for displaying a plurality of current ancestor hierarchies for the plurality of items in the tree structure.

* * * * *